(12) United States Patent
Yamamoto

(10) Patent No.: US 12,234,905 B2
(45) Date of Patent: Feb. 25, 2025

(54) POWER TRANSMISSION DEVICE

(71) Applicant: TOYOTA JIDOSHA KABUSHIKI KAISHA, Toyota (JP)

(72) Inventor: Hiroshi Yamamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/455,794

(22) Filed: Aug. 25, 2023

(65) Prior Publication Data

US 2024/0117874 A1  Apr. 11, 2024

(30) Foreign Application Priority Data

Oct. 7, 2022  (JP) .................................. 2022-162199

(51) Int. Cl.
  *F16H 57/04*  (2010.01)
  *F16H 57/029*  (2012.01)

(52) U.S. Cl.
  CPC ....... *F16H 57/0453* (2013.01); *F16H 57/029* (2013.01); *F16H 57/0415* (2013.01); *F16H 57/0427* (2013.01); *F16H 57/0436* (2013.01); *F16H 57/0457* (2013.01)

(58) Field of Classification Search
  CPC ............. F16H 57/0436; F16H 57/0457; F16H 57/0447; F16H 57/0413; F16H 57/0409; F16H 57/045; F16H 57/0483; F16H 57/0423; F16H 57/0441; F16H 57/0424
  USPC ....................................................... 184/6.12
  See application file for complete search history.

(56) References Cited

U.S. PATENT DOCUMENTS

| | | | | |
|---|---|---|---|---|
| 1,220,810 | A * | 3/1917 | Alquist | F16H 57/0447 184/6.12 |
| 3,529,698 | A * | 9/1970 | Nelson | F16H 57/0447 184/6.12 |
| 3,625,310 | A * | 12/1971 | Herrick | F16N 19/003 184/6.12 |
| 3,785,458 | A * | 1/1974 | Caldwell | B60R 17/00 184/6.12 |
| 3,800,913 | A * | 4/1974 | Schmitt | F01M 1/12 74/606 R |
| 4,169,519 | A * | 10/1979 | Hirt | F16H 57/0447 184/6.12 |
| 4,352,301 | A * | 10/1982 | Fleury | F16H 57/0434 184/6.12 |
| 4,378,711 | A * | 4/1983 | Daniel | F16H 57/0421 184/6.12 |

(Continued)

FOREIGN PATENT DOCUMENTS

JP  2020-091001 A  6/2020

*Primary Examiner* — Henry Y Liu
(74) *Attorney, Agent, or Firm* — Oliff PLC

(57) ABSTRACT

A power transmission device includes: a case including a first oil reservoir configured to be able to store oil, a second oil reservoir configured to be able to store the oil, and a partition wall configured to separate the first oil reservoir and the second oil reservoir; the oil sealed in the case; a rotating member configured to be able to be in contact with the oil in the first oil reservoir; and an oil supplying unit configured to be able to supply the oil in the second oil reservoir to the first oil reservoir. The oil supplying unit is configured to be able to adjust an amount of the oil in the second oil reservoir supplied to the first oil reservoir.

4 Claims, 2 Drawing Sheets

(56) References Cited

U.S. PATENT DOCUMENTS

| | | | | |
|---|---|---|---|---|
| 4,658,665 A * | 4/1987 | Strinzel | F16N 7/38 | 184/6.12 |
| 4,693,133 A * | 9/1987 | Tomita | F16H 57/0006 | 184/6.12 |
| 4,715,244 A * | 12/1987 | Byrd | F16H 57/0402 | 184/6.12 |
| 4,721,184 A * | 1/1988 | Sowards | F16N 29/04 | 184/6.12 |
| 4,922,765 A * | 5/1990 | Hayakawa | B60K 17/344 | 184/6.12 |
| 5,115,887 A * | 5/1992 | Smith | F16H 57/0447 | 184/6.12 |
| 5,121,815 A * | 6/1992 | Francois | B64C 27/12 | 184/6.12 |
| 5,161,644 A * | 11/1992 | Swenskowski | F16H 57/0447 | 184/6.12 |
| 5,505,112 A * | 4/1996 | Gee | F16H 57/0447 | 184/6.12 |
| 5,540,300 A * | 7/1996 | Downs | F16H 57/0457 | 184/104.1 |
| 5,839,327 A * | 11/1998 | Gage | F16H 57/0457 | 184/13.1 |
| 6,299,561 B1 * | 10/2001 | Kramer | F16H 57/0447 | 184/6.12 |
| 6,644,439 B2 * | 11/2003 | Schnitzer | F16H 57/0456 | 184/6.12 |
| 6,718,847 B2 * | 4/2004 | Rimkus | F16H 57/027 | 184/6.12 |
| 7,213,682 B2 * | 5/2007 | Gibson | F16H 57/0421 | 184/6.12 |
| 7,878,304 B2 * | 2/2011 | Reis | F16H 57/0447 | 184/6.12 |
| 8,267,223 B2 * | 9/2012 | Ideshio | B60K 6/52 | 184/6.12 |
| 8,657,073 B2 * | 2/2014 | Matsumoto | F16H 57/0483 | 184/6.12 |
| 8,739,930 B2 * | 6/2014 | Bonning | F16H 57/0436 | 184/6.12 |
| 8,746,405 B2 * | 6/2014 | Perakes | F16H 57/0409 | 184/6.12 |
| 8,875,841 B2 * | 11/2014 | Yoshimi | F16H 57/0409 | 184/6.12 |
| 9,133,927 B2 * | 9/2015 | Jarvinen | F16H 57/0456 | |
| 9,377,099 B2 * | 6/2016 | Gianone | F16H 57/0436 | |
| 9,739,363 B2 * | 8/2017 | Schweiher | F16H 57/0457 | |
| 10,208,848 B2 * | 2/2019 | Hotait | F16H 57/0463 | |
| 10,252,611 B2 * | 4/2019 | Errick | B60K 11/085 | |
| 10,502,309 B2 * | 12/2019 | Kaemmerer | F16H 57/021 | |
| 10,823,279 B2 * | 11/2020 | Kaemmerer | F16H 57/0424 | |
| 10,941,850 B2 * | 3/2021 | Wu | F16H 57/03 | |
| 11,060,601 B2 * | 7/2021 | Farhat | F16H 57/0416 | |
| 11,192,446 B2 * | 12/2021 | Errick | B60K 11/085 | |
| 11,662,014 B2 * | 5/2023 | Wu | F16H 57/021 | 74/606 R |
| 11,796,048 B2 * | 10/2023 | Farhat | F16H 48/08 | |
| 2005/0103570 A1 * | 5/2005 | Gibson | F16H 57/0421 | 184/6.12 |
| 2005/0224020 A1 * | 10/2005 | Gregory | F01P 7/16 | 123/41.31 |
| 2010/0064991 A1 * | 3/2010 | Mizoguchi | B60T 5/00 | 123/41.12 |
| 2013/0152882 A1 * | 6/2013 | Potter | F16H 57/0413 | 184/104.1 |
| 2014/0020984 A1 * | 1/2014 | Gianone | F16H 57/0447 | 184/6.12 |
| 2014/0130753 A1 * | 5/2014 | Koyama | F01P 7/167 | 123/41.05 |
| 2014/0158467 A1 * | 6/2014 | Kimura | F01M 5/002 | 184/6 |
| 2016/0214460 A1 * | 7/2016 | Errick | F28D 1/0435 | |
| 2018/0023683 A1 * | 1/2018 | Kelly | F28D 1/0341 | 165/51 |
| 2019/0184812 A1 * | 6/2019 | Errick | F28D 1/0435 | |
| 2021/0180680 A1 * | 6/2021 | Farhat | F16H 57/0456 | |

* cited by examiner

POWER TRANSMISSION DEVICE

CROSS-REFERENCE TO RELATED APPLICATION

This application claims priority to Japanese Patent Application No. 2022-162199 filed on Oct. 7, 2022 incorporated herein by reference in its entirety.

BACKGROUND

1. Technical Field

The present disclosure relates to a power transmission device.

2. Description of Related Art

For example, Japanese Unexamined Patent Application Publication No. 2020-91001 (JP 2020-91001 A) discloses a power transmission device including a case, oil, a rotating part, a scavenging pump, a feeding pump, and an oil cooler. The case includes a first chamber, a second chamber, and a partition wall separating the first chamber and the second chamber. A rotating member is disposed in the first chamber. The oil in the first chamber is fed to the second chamber by the scavenging pump, and the oil in the second chamber is fed to the oil cooler by the feeding pump. The oil flowing out of the oil cooler is supplied to the rotating member, a gear, etc., and flows into each chamber.

SUMMARY

In the power transmission device described in JP 2020-91001 A, for example, when the temperature of the oil is low, the viscosity of the oil increases. Therefore, it is desirable to raise the temperature of the oil early.

The present disclosure provides a power transmission device that is able to shorten the time required for the temperature of oil to rise.

An aspect of the present disclosure relates to a power transmission device that includes a case, oil, a rotating member, and an oil supplying unit. The case includes a first oil reservoir configured to be able to store the oil, a second oil reservoir configured to be able to store the oil, and a partition wall configured to separate the first oil reservoir and the second oil reservoir. The oil is sealed in the case. The rotating member is configured to be able to be in contact with the oil in the first oil reservoir. The oil supplying unit is configured to be able to supply the oil in the second oil reservoir to the first oil reservoir. In addition, the oil supplying unit is configured to be able to adjust an amount of the oil in the second oil reservoir supplied to the first oil reservoir.

In the power transmission device according to an aspect of the present disclosure, the oil supplying unit may be constituted by an oil pump.

In the power transmission device according to an aspect of the present disclosure, the oil supplying unit may be configured to adjust the amount of the oil in the second oil reservoir supplied to the first oil reservoir by the oil supplying unit such that an oil level of the oil is positioned at a height that at least a lower part of the rotating member is immersed in the oil, and to raise temperature of the oil in the first oil reservoir by rotation of the rotating member.

In the power transmission device according to an aspect of the present disclosure, the second oil reservoir may be disposed above the first oil reservoir. Further, the rotating member may be configured to scoop up the oil in the first oil reservoir toward the second oil reservoir.

In the power transmission device according to an aspect of the present disclosure, an oil cooler may further be included that is provided outside the case and that is configured to be able to cool the oil by causing heat exchange between the oil and a cooling medium.

In the power transmission device according to the configuration as described above, a control unit may further be included that is configured to control the oil supplying unit. Further, the control unit may be configured to, when a request is received from equipment that is supplied with the cooling medium flowing out of the oil cooler, increase the amount of the oil in the second oil reservoir supplied to the first oil reservoir by the oil supplying unit.

In the power transmission device of the present disclosure, it is possible to provide a power transmission device that is able to shorten the time required for the temperature of oil to rise.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
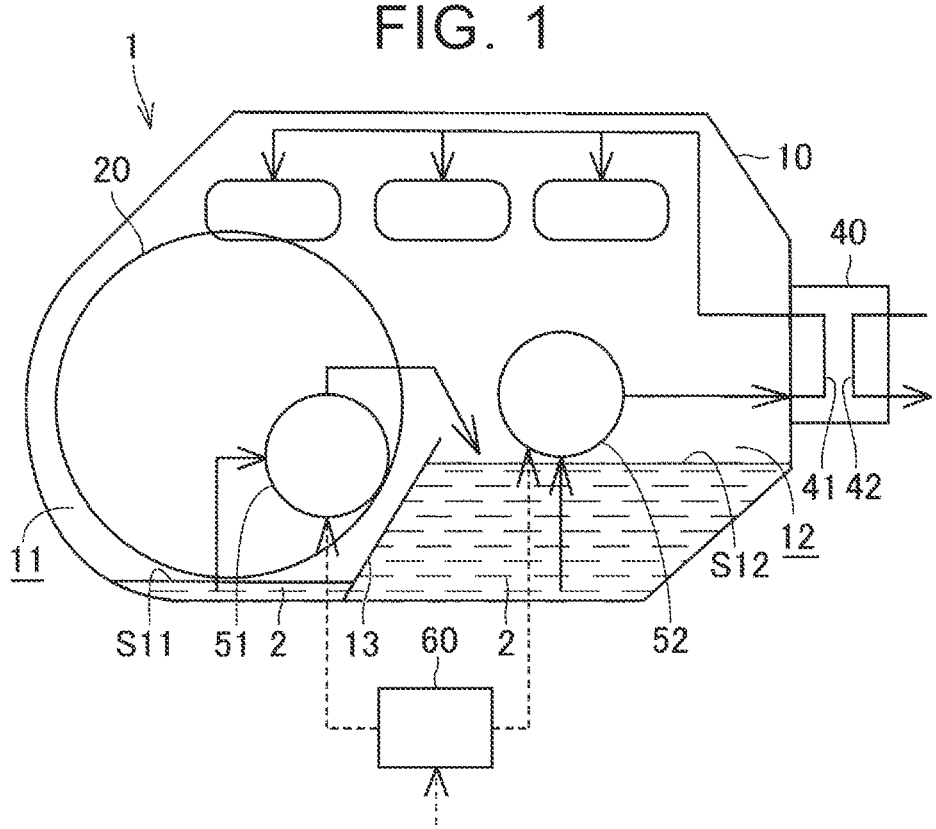
FIG. 1 is a diagram schematically showing a power transmission device according to a first embodiment of the present disclosure.

Embodiments of the present disclosure will be described with reference to the drawings. In the drawings referred to below, the same or corresponding members are given the same numbers.

FIG. 1 is a diagram schematically showing a power transmission device according to a first embodiment of the present disclosure. A power transmission device 1 is preferably applied to a transaxle mounted on a vehicle or a drive unit including a built-in motor. The power transmission device 1 transmits torque output by a power source (not shown) to an output member such as a drive shaft.

As shown in FIG. 1, the power transmission device 1 includes a case 10, a rotating member 20, an oil cooler 40, a feeding unit 51, an oil supplying unit 52, and a control unit 60. FIG. 1 shows the power transmission device 1 during normal operation or in the stopped state.

The case 10 constitutes an outer shell of the power transmission device 1. Oil 2 is sealed in the case 10. The case 10 includes a first oil reservoir 11, a second oil reservoir 12, and a partition wall 13.

The first oil reservoir 11 can store the oil 2. The first oil reservoir 11 is provided in the lower part of the case 10.

The second oil reservoir 12 can store the oil 2. The second oil reservoir 12 is provided in the lower part of the case 10. In the present embodiment, the second oil reservoir 12 is adjacent to the first oil reservoir 11.

The partition wall 13 separates the first oil reservoir 11 and the second oil reservoir 12.

The rotating member 20 is disposed in the first oil reservoir 11. The rotating member 20 is a member that rotates while being supplied with the oil 2 in the first oil reservoir 11. Examples of the rotating member 20 include a motor generator, a motor, a gear, a bearing, and the like. As shown in FIG. 1, the rotating member 20 is disposed at a position higher than an oil level S11 of the first oil reservoir 11 during normal operation or in the stopped state. Therefore, the rotating member 20 rotates in the first oil reservoir 11 while receiving substantially no stirring resistance of the oil 2. The rotating member 20 can contact the oil 2 in the first oil reservoir 11.

The oil cooler 40 is provided outside the case 10. The oil cooler 40 can cool oil by causing heat exchange between the oil 2 and a cooling medium. The oil cooler 40 includes an oil flow path 41 through which the oil 2 flows, and a cooling medium flow path 42 through which the cooling medium flows. The cooling medium flowing out of the cooling medium flow path 42 is supplied to heating equipment, a battery, etc.

The feeding unit 51 feeds the oil 2 in the first oil reservoir 11 to the second oil reservoir 12. In the present embodiment, the feeding unit 51 is constituted by a scavenging pump. However, the feeding unit 51 is not limited to the scavenging pump.

The oil supplying unit 52 can supply the oil 2 in the second oil reservoir 12 to the first oil reservoir 11. In the present embodiment, the oil supplying unit 52 feeds the oil 2 in the second oil reservoir 12 to the oil cooler 40. The oil supplying unit 52 is constituted by, for example, an oil pump. The oil 2 flowing out of the oil supplying unit 52 flows into the oil flow path 41 of the oil cooler 40. The oil 2 flowing out of the oil flow path 41 is supplied from the upper part of the case 10 to the rotating member 20, a gear, etc., and flows into the oil reservoirs 11 and 12. That is, the oil supplying unit 52 can supply the oil 2 from the second oil reservoir 12 to the first oil reservoir 11 via the oil cooler 40. Further, the inside of the first oil reservoir 11 is in a so-called dry sump state.

The control unit 60 controls the feeding unit 51 and the oil supplying unit 52. When the increase condition that shows an increase in an amount of the oil 2 in the second oil reservoir 12 to be supplied to the first oil reservoir 11 is established, the control unit 60 decreases the rotation speed of the feeding unit 51 or stops the feeding unit 51, while increasing the rotation speed of the oil supplying unit 52. For example, the control unit 60 determines that the increase condition has been established when the control unit 60 receives a request from equipment that is supplied with the cooling medium flowing out of the oil cooler 40 (in a case where the control unit 60 receives a signal output when the heating switch is turned on, a signal output when the battery warming-up is started, or the like, for example). The control unit 60 may increase the amount of the oil 2 in the second oil reservoir 12 to be supplied to the first oil reservoir 11 when the rotating member 20 rotates.

When the decrease condition that shows a decrease in the amount of the oil 2 in the second oil reservoir 12 to be supplied to the first oil reservoir 11 is established, the control unit 60 increases the rotation speed of the feeding unit 51, while decreasing the rotation speed of the oil supplying unit 52. For example, the control unit 60 determines that the decrease condition has been established when the request from the equipment stops (in a case where the control unit 60 receives a signal output when the heating switch is turned off, a signal output when the battery warming-up is terminated, or the like, for example).

Next, the operation of the power transmission device 1 will be described.

When the power transmission device 1 is in the steady operation state or in the stopped state, the oil level S12 of the second oil reservoir 12 is higher than the oil level S11 of the first oil reservoir 11. Specifically, as shown in FIG. 1, the oil level S11 of the first oil reservoir 11 is approximately at a position where the oil does not come into contact with the rotating member 20 or slightly comes into contact with the rotating member 20. When the power transmission device 1 is in the steady operation state or in the stopped state, the rotation speed of the feeding unit 51 and the rotation speed of the oil supplying unit 52 are adjusted such that the oil levels S11 and S12 are at height positions shown in FIG. 1.

Figure 2:
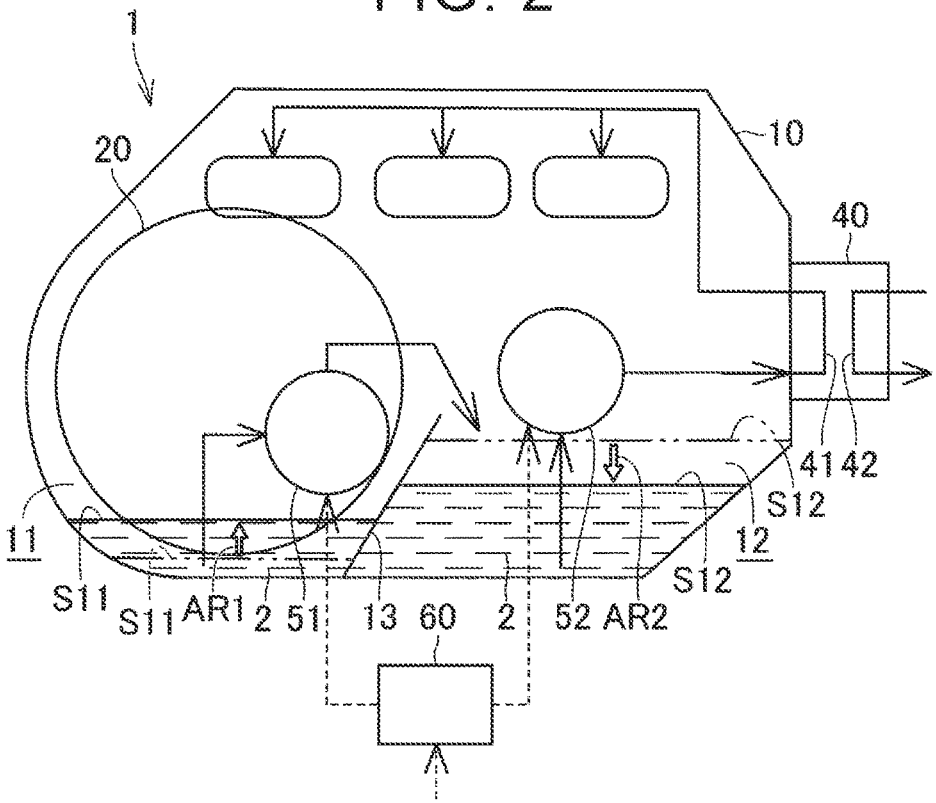
FIG. 2 is a diagram schematically showing the power transmission device shown in FIG. 1 in a state where an amount of oil in a second oil reservoir supplied to a first oil reservoir by an oil supplying unit has been increased.

In the above state, when the control unit 60 receives the request from the equipment (for example, in a case where the control unit 60 receives a signal output when the heating switch is turned on), the control unit 60 increases the amount of the oil 2 in the second oil reservoir 12 supplied to the first oil reservoir 11. That is, the rotation speed of the feeding unit 51 is decreased or the feeding unit 51 is stopped, while the rotation speed of the oil supplying unit 52 is increased. As a result, the amount of the oil 2 in the second oil reservoir 12 flowing into the first oil reservoir 11 increases. Accordingly, as shown in FIG. 2, the oil level S12 of the second oil reservoir 12 drops as shown by an arrow AR2, while the oil level S11 of the first oil reservoir 11 rises as shown by an arrow AR1. In FIG. 2, the oil levels S11 and S12 in a state before the rotation speeds of the feeding unit 51 and the oil supplying unit 52 are adjusted are shown by long dashed double-short dashed lines.

As a result, at least part (lower part) of the rotating member 20 is immersed in the oil 2, thereby increasing the contact area of the rotating member 20 with the oil 2. Accordingly, the stirring resistance of the oil 2 by the rotating member 20 increases. Therefore, the temperature of the oil 2 in the first oil reservoir 11 rises. As the oil 2 in the first oil reservoir 11 is fed to the second oil reservoir 12 by the feeding unit 51, the temperature of the oil 2 in the second oil reservoir 12 also rises. As a result, the temperature of the oil 2 fed to the oil flow path 41 of the oil cooler 40 also rises. Therefore, the temperature of the cooling medium flowing out of the cooling medium flow path 42 rises early.

Subsequently, when the request from the equipment is stopped (for example, in a case where the control unit 60 receives a signal output when the heating switch is turned off), the control unit 60 increases the rotation speed of the feeding unit 51 and decreases the rotation speed of the oil supplying unit 52. As a result, the oil levels S11 and S12 of the first oil reservoir 11 and the second oil reservoir 12 return to the positions at which the power transmission device 1 is in the steady operation state or in the stopped state, for example.

As described above, in the power transmission device 1 according to the present embodiment, the amount of the oil 2 in the second oil reservoir 12 supplied to the first oil reservoir 11 by the oil supplying unit 52 is adjusted such that the oil level of the first oil reservoir 11 is positioned at a height that at least the lower part of the rotating member 20 is immersed in the oil 2. Therefore, the temperature of the oil 2 in the first oil reservoir 11 rises by the rotation of the rotating member 20. The oil 2 in the first oil reservoir 11 flows through the second oil reservoir 12 into the oil cooler 40 where the oil 2 exchanges heat with the cooling medium.

Accordingly, it is possible to shorten the time required for the temperature of the cooling medium flowing out of the oil cooler 40 to rise.

Next, the power transmission device 1 according to a second embodiment of the present disclosure will be described with reference to FIG. 3. In the second embodiment, only parts different from those of the first embodiment will be described, and descriptions of the same structures, operations and effects as those of the first embodiment will not be repeated.

In the present embodiment, the second oil reservoir 12 is disposed above the first oil reservoir 11. Further, the feeding unit 51 is constituted by the rotating member 20. As shown by an arrow AR3 in FIG. 3, the rotating member 20 scoops up the oil 2 in the first oil reservoir 11 toward the second oil reservoir 12.

In the present embodiment, the partition wall 13 defines the second oil reservoir 12. The partition wall 13 has a shape that opens upward. The partition wall 13 includes a bottom portion 13a and a peripheral wall portion 13b. The bottom portion 13a has a flat plate shape. The peripheral wall portion 13b rises from the edges of the bottom portion 13a, and has an annular shape.

The peripheral wall portion 13b includes an overlapping portion 13c. The overlapping portion 13c is positioned above the rotating member 20 in the vertical direction. The overlapping portion 13c has an inclined shape so as to gradually approach the rotating member 20 as it goes upward from the bottom portion 13a. The upper end of the overlapping portion 13c is positioned lower than the upper end of the rotating member 20.

Figure 3:
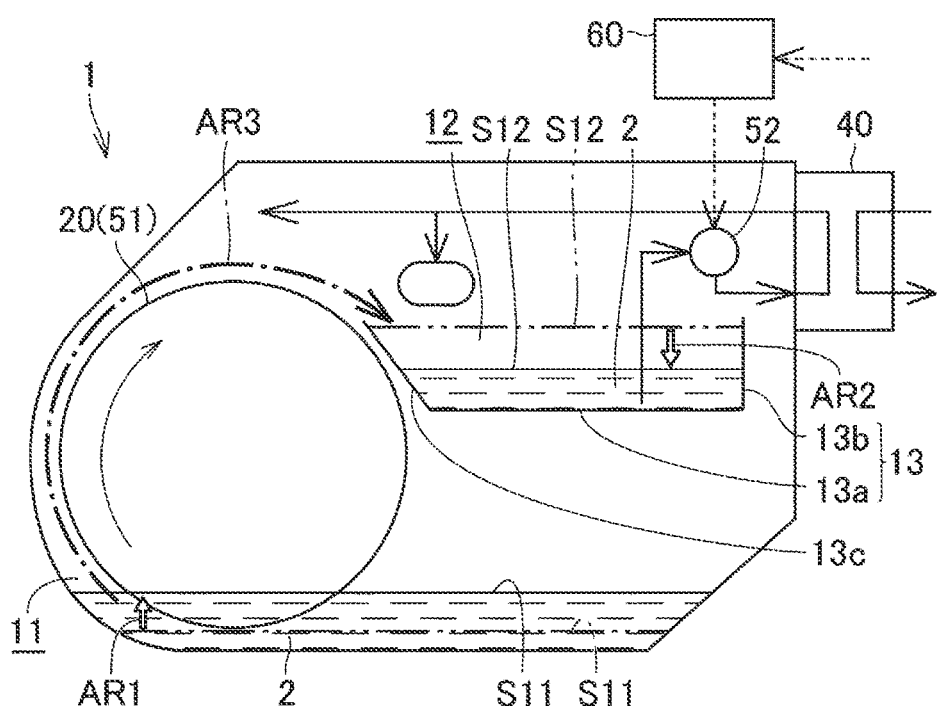
FIG. 3 is a diagram schematically showing the power transmission device according to a second embodiment of the present disclosure.

In FIG. 3, the oil levels S11 and S12 in a state after the amount of the oil 2 in the second oil reservoir 12 supplied to the first oil reservoir 11 by the oil supplying unit 52 has been increased are shown by solid lines. Further, the oil levels S11 and S12 in a state before the amount of the oil 2 in the second oil reservoir 12 supplied to the first oil reservoir 11 by the oil supplying unit 52 has been increased are shown by long dashed double-short dashed lines.

In the present embodiment, since the rotating member 20 also serves as the feeding unit 51, dedicated equipment (such as an oil pump) for feeding the oil 2 from the first oil reservoir 11 to the second oil reservoir 12 can be omitted.

The embodiments disclosed herein should be considered as illustrative and not restrictive in all respects. The scope of the present disclosure is shown by the claims rather than the above embodiments, and also includes all modifications within the meaning and the scope equivalent to those of the claims.

What is claimed is:

1. A power transmission device comprising:
   a case including a first oil reservoir configured to be able to store oil, a second oil reservoir configured to be able to store the oil, and a partition wall configured to separate the first oil reservoir and the second oil reservoir;
   the oil sealed in the case;
   a rotating member configured to be able to be in contact with the oil in the first oil reservoir;
   an oil supplying unit configured to be able to supply the oil in the second oil reservoir to the first oil reservoir, wherein
   the oil supplying unit is configured to be able to adjust an amount of the oil in the second oil reservoir supplied to the first oil reservoir;
   an oil cooler that is provided outside the case and that is configured to be able to cool the oil by causing heat exchange between the oil and a cooling medium; and
   a control unit configured to control the oil supplying unit, wherein the control unit is configured to, when a request is received from equipment that is supplied with the cooling medium flowing out of the oil cooler, increase the amount of the oil in the second oil reservoir supplied to the first oil reservoir by the oil supplying unit.

2. The power transmission device according to claim 1, wherein the oil supplying unit is constituted by an oil pump.

3. The power transmission device according to claim 1, wherein the oil supplying unit is configured to adjust the amount of the oil in the second oil reservoir supplied to the first oil reservoir by the oil supplying unit such that an oil level of the oil is positioned at a height that at least a lower part of the rotating member is immersed in the oil, and to raise temperature of the oil in the first oil reservoir by rotation of the rotating member.

4. The power transmission device according to claim 1, wherein:
   the second oil reservoir is disposed above the first oil reservoir; and
   the rotating member is configured to scoop up the oil in the first oil reservoir toward the second oil reservoir.

* * * * *